(12) United States Patent
Sambhwani et al.

(10) Patent No.: US 11,792,747 B2
(45) Date of Patent: Oct. 17, 2023

(54) ELECTRONIC DEVICES WITH TIME DOMAIN RADIO-FREQUENCY EXPOSURE AVERAGING

(71) Applicant: Apple Inc., Cupertino, CA (US)

(72) Inventors: Sharad Sambhwani, San Diego, CA (US); Digvijay A. Jadhav, San Jose, CA (US); Dirk Nickisch, Oberpframmern (DE); Gil Katzir, Binyamina (IL); Laxminarayana Pillutla, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/866,322

(22) Filed: Jul. 15, 2022

(65) Prior Publication Data

US 2022/0408378 A1 Dec. 22, 2022

Related U.S. Application Data

(63) Continuation of application No. 17/349,793, filed on Jun. 16, 2021, now Pat. No. 11,432,249.

(51) Int. Cl.
*H04W 52/36* (2009.01)
(52) U.S. Cl.
CPC ................ *H04W 52/367* (2013.01)
(58) Field of Classification Search
CPC .............................................. H04W 52/00–60
See application file for complete search history.

(56) References Cited

U.S. PATENT DOCUMENTS

| | | | |
|---|---|---|---|
| 9,380,541 B1 | 6/2016 | Lu et al. | |
| 9,622,187 B2 | 4/2017 | Logan et al. | |
| 10,129,834 B2 | 11/2018 | Yao et al. | |
| 10,924,146 B2 | 2/2021 | Kaidar et al. | |
| 2009/0285313 A1* | 11/2009 | Vossiek | G01S 13/825 375/259 |
| 2015/0200448 A1* | 7/2015 | Tsai | H01Q 1/243 29/601 |
| 2018/0336308 A1* | 11/2018 | Dokken | G01S 13/87 |
| 2019/0200365 A1* | 6/2019 | Sampath | H04W 52/242 |
| 2020/0015171 A1* | 1/2020 | Nadakuduti | H04W 52/12 |
| 2020/0112926 A1* | 4/2020 | Laghate | H04B 7/0404 |

(Continued)

*Primary Examiner* — Raymond S Dean
(74) *Attorney, Agent, or Firm* — Treyz Law Group, P.C.; Michael H. Lyons

(57) ABSTRACT

An electronic device may include a radio that generates a first maximum power based on a radio-frequency exposure (RFE) budget. The radio may transmit signals subject to the first maximum power during a subperiod of an averaging period and may generate an instantaneous RFE metric value based on an antenna coefficient and the conducted transmit power of the antenna during the subperiod. The radio may generate a consumed RFE value by averaging the instantaneous RFE metric value with previous instantaneous RFE values from the averaging period, may generate a remaining budget based on the consumed RFE value, may generate a second maximum transmit power based on the remaining budget, and may transmit signals during a subsequent subperiod subject to the second maximum power. Time-averaging the RFE metric may serve to optimize performance of the radio relative to scenarios where the radio performs time-averaging of conducted TX power.

20 Claims, 7 Drawing Sheets

(56) References Cited

U.S. PATENT DOCUMENTS

| | | | |
|---|---|---|---|
| 2020/0371146 A1* | 11/2020 | Hochwald | G01R 29/0892 |
| 2020/0374882 A1* | 11/2020 | Cai | H04W 72/0473 |
| 2021/0051601 A1 | 2/2021 | Cha et al. | |
| 2021/0282093 A1* | 9/2021 | Taherzadeh Boroujeni | H04W 52/367 |

* cited by examiner

ELECTRONIC DEVICES WITH TIME DOMAIN RADIO-FREQUENCY EXPOSURE AVERAGING

This is a continuation of U.S. patent application Ser. No. 17/349,793, filed Jun. 16, 2021, which is hereby incorporated by reference herein in its entirety.

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The antennas transmit radio-frequency signals. During transmission, the radio-frequency signals are sometimes incident upon nearby external objects such as the body of a user or another person.

Electronic devices with wireless capabilities are typically operated in geographic regions that impose regulatory limits on the amount of radio-frequency exposure produced by the electronic device in transmitting radio-frequency signals. It can be challenging to design electronic devices that meet these regulatory limits without sacrificing an excessive amount of radio-frequency performance, particularly as the device transitions between a wide range of operating environments.

SUMMARY

An electronic device may include wireless circuitry controlled by one or more processors. The wireless circuitry may include radios that transmit radio-frequency signals using at least one antenna. The radios may include a first set of one or more radios that transmit radio-frequency signals at frequencies less than 6 GHz. The radios may include a second set of one or more radios that transmit radio-frequency signals at frequencies greater than 6 GHz. The first set of radios may be subject to a regulatory specific absorption rate (SAR) limit over a regulatory averaging period. The second set of radios may be subject to a regulatory maximum permissible exposure (MPE) limit over the regulatory averaging period.

The wireless circuitry may include a radio-frequency (RF) exposure metric manager. The RF exposure metric manager may assign a radio-frequency exposure (RFE) budget (e.g., SAR and/or MPE budgets) to each of the radios. Each radio may generate a first maximum transmit power level based on its assigned RFE budget and an antenna coefficient associated with an antenna used by the radio for transmission. The antenna coefficient may also correspond to a combination of duty cycle, frequency band, radio-access technology, and device position. The radio may transmit first radio-frequency signals during a first subperiod of the averaging period. The radio may generate an instantaneous RFE metric value based on the conducted transmit power of the radio and antenna during the first subperiod and based on the antenna coefficient. The radio may generate a consumed RFE metric value by averaging the instantaneous RFE metric value with one or more instantaneous RFE metric values gathered during one or more prior subperiods of the averaging period. The radio may generate a remaining RFE budget based on the assigned RFE budget and the consumed RFE metric value. The radio may generate a second maximum transmit power level based on the remaining RFE budget and the antenna coefficient. The radio may transmit second radio-frequency signals during a subsequent subperiod of the averaging period and subject to the second maximum transmit power level. This process may iterate to adjust maximum transmit power level over the averaging period to ensure RFE compliance for the radio. Performing time-averaging of the RFE metric may serve to optimize the radio-frequency performance of the radio relative to scenarios where the radio performs time-averaging of conducted TX power.

An aspect of the disclosure provides an electronic device. The electronic device can include an antenna. The electronic device can include a radio communicably coupled to the antenna. The electronic device can include one or more processors. The one or more processors can be configured to generate a first maximum transmit power level based on a radio-frequency exposure (RFE) budget assigned to the radio and an antenna coefficient associated with the antenna. The radio can be configured to transmit first radio-frequency signals using the antenna during a first subperiod of an averaging period while subject to the first maximum transmit power level. The one or more processors can be configured to generate an instantaneous RFE metric value based on the antenna coefficient and a conducted transmit power of the antenna during the first subperiod. The one or more processors can be configured to generate a consumed RFE metric value by averaging the instantaneous RFE metric value with at least one additional instantaneous RFE metric value generated by the one or more processors for one or more subperiods of the averaging period that are prior to the first subperiod. The one or more processors can be configured to generate a remaining RFE budget for the averaging period based on the consumed RFE metric value and the RFE budget. The one or more processors can be configured to generate a second maximum transmit power level based on the remaining RFE budget and the antenna coefficient. The radio can be configured to use the antenna to transmit second radio-frequency signals during a second subperiod of the averaging period subsequent to the first subperiod while subject to the second maximum transmit power level.

An aspect of the disclosure provides a method of operating an electronic device having one or more antennas configured to handle one or more radio-frequency polarizations, a radio subject to a limit on radio-frequency exposure (RFE) over an averaging period, and one or more processors. The method can include with the radio, transmitting first radio-frequency signals using the one or more antennas antenna during a first subperiod of the averaging period while subject to a first maximum transmit power level. The method can include with the one or more processors, generating an instantaneous RFE metric value based on an antenna coefficient associated with the one or more antennas and based on a conducted transmit power of the one or more antennas during the first subperiod. The method can include with the one or more processors, generating a consumed RFE metric value by averaging the instantaneous RFE metric value with at least one additional instantaneous RFE metric value generated for one or more subperiods of the averaging period that are prior to the first subperiod. The method can include with the one or more processors, generating a remaining RFE budget for the averaging period based on the consumed RFE metric value. The method can include with the one or more processors, generating a second maximum transmit power level based on the remaining RFE budget. The method can include with the radio, transmitting second radio-frequency signals using at least one of the one or more antennas during a second subperiod of the averaging period while subject to the second maximum transmit power level, the second subperiod being subsequent to the first subperiod.

An aspect of the disclosure provides an electronic device. The electronic device can include one or more antennas. The electronic device can include a radio communicably coupled to the one or more antennas and subject to a limit on maximum permissible exposure (MPE) over an averaging period. The electronic device can include one or more processors configured. The one or more processors can be configured to convert an MPE budget assigned to the radio into a first maximum transmit power level. The radio can be configured to transmit first radio-frequency signals at a frequency greater than 6 GHz using at least one of the one or more antennas during a subperiod of the averaging period and while subject to the first maximum transmit power level. The one or more processors can be configured to generate an instantaneous MPE value based on a conducted transmit power of the one or more antennas during the subperiod. The one or more processors can be configured to generate a consumed MPE value by averaging the instantaneous MPE value with at least one prior instantaneous MPE metric value generated during the averaging period. The one or more processors can be configured to generate a remaining MPE budget for the averaging period based on the consumed MPE value and the MPE budget. The one or more processors can be configured to generate a second maximum transmit power level based on the remaining MPE budget. The radio can be configured to transmit second radio-frequency signals at the frequency greater than 6 GHz using at least one of the one or more antennas during a subsequent subperiod of the averaging period and while subject to the second maximum transmit power level.

DETAILED DESCRIPTION

Figure 1:
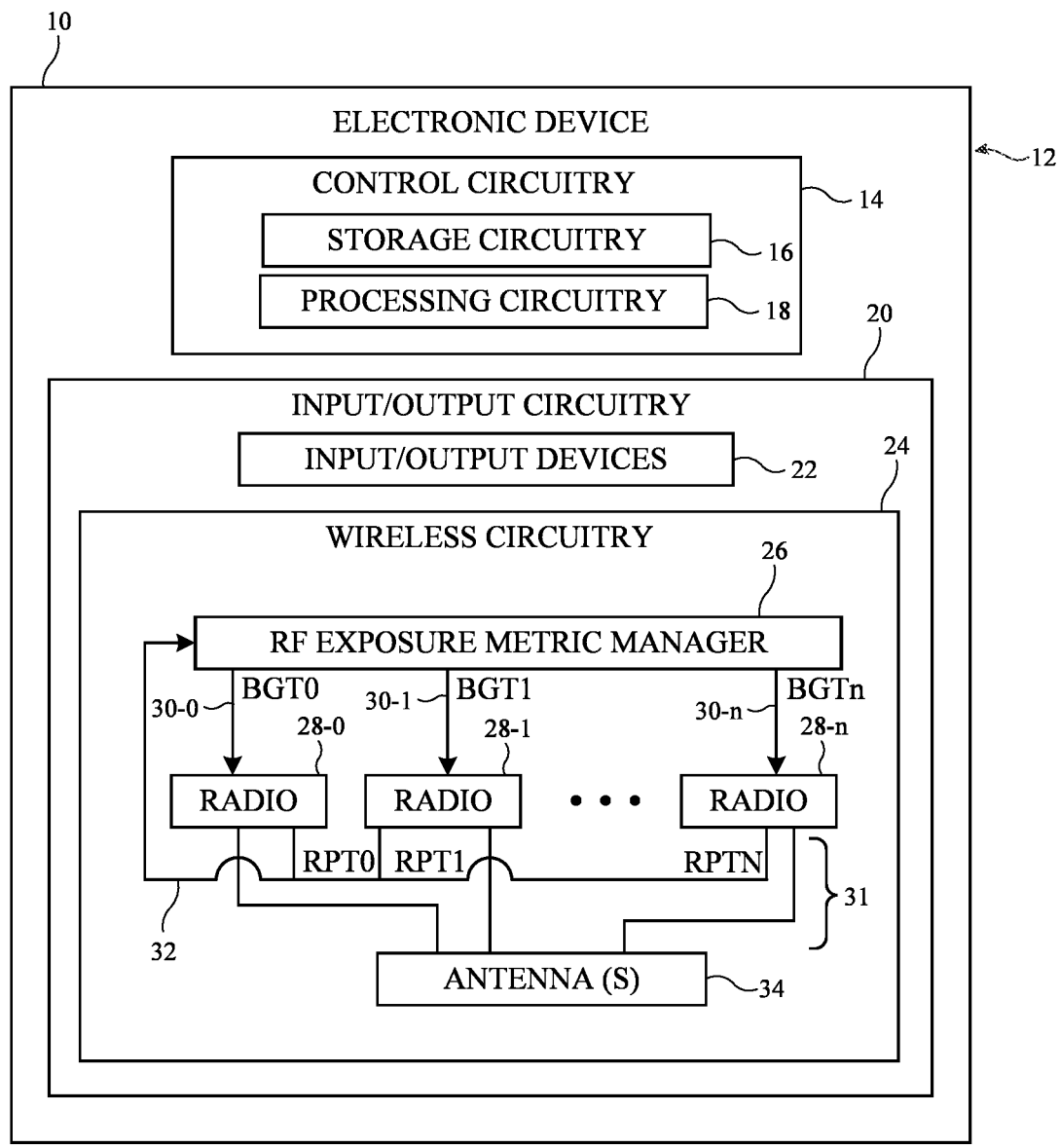
FIG. 1 is a block diagram of an illustrative electronic device having wireless circuitry with radios that transmit radio-frequency signals according to radio-frequency exposure (RFE) metric budgets in accordance with some embodiments.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors, microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications and/or radio-based spatial ranging operations. Wireless circuitry 24 may include one or more antennas 34. Wireless circuitry 24 may also include n+1 radios 28 (e.g., a first radio 28-0, a second radio 28-1, an (n+1)th radio 28-n, etc.). Each radio 28 may include circuitry that operates on signals at baseband frequencies (e.g., baseband circuitry), signal generator circuitry, modulation/demodulation circuitry (e.g., one or more modems), radio-frequency transceiver circuitry (e.g., radio-frequency transmitter circuitry, radio-frequency receiver circuitry, mixer circuitry for downconverting radio-frequency signals to baseband frequencies or intermediate frequencies between radio and baseband frequencies and/or for upconverting signals at baseband or intermediate frequencies to radio-frequencies, etc.), amplifier circuitry (e.g., one or more power amplifiers and/or one or more low-noise amplifiers (LNAs)), analog-to-digital converter (ADC) circuitry, digital-to-analog converter (DAC) circuitry, control paths, power supply paths, signal paths (e.g., radio-frequency transmission lines, intermediate frequency transmission lines, baseband signal lines, etc.), switching circuitry, filter circuitry, and/or any other circuitry for transmitting and/or receiving radio-frequency signals using antenna(s) 34. The components of each radio 28 may be mounted onto a respective substrate or integrated into a respective integrated circuit, chip, package, or system-on-chip (SOC). If desired, the components of multiple radios 28 may share a single substrate, integrated circuit, chip, package, or SOC.

Antenna(s) 34 may be formed using any desired antenna structures. For example, antenna(s) 34 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antenna(s) 34 over time.

Transceiver circuitry in radios 28 may convey radio-frequency signals using one or more antennas 34 (e.g., antenna(s) 34 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antenna(s) 34 may transmit the radio-frequency signals by radiating the radio-frequency signals into free space (or to free space through intervening device structures such as a dielectric cover layer). Antenna(s) 34 may additionally or alternatively receive the radio-frequency signals from free space (e.g., through intervening devices structures such as a dielectric cover layer). The transmission and reception of radio-frequency signals by antenna(s) 34 each involve the excitation or resonance of antenna currents on an antenna resonating element in the antenna by the radio-frequency signals within the frequency band(s) of operation of the antenna.

Each radio 28 may be coupled to one or more antennas 34 over one or more radio-frequency transmission lines 31. Radio-frequency transmission lines 31 may include coaxial cables, microstrip transmission lines, stripline transmission lines, edge-coupled microstrip transmission lines, edge-coupled stripline transmission lines, transmission lines formed from combinations of transmission lines of these types, etc. Radio-frequency transmission lines 31 may be integrated into rigid and/or flexible printed circuit boards if desired. One or more radio-frequency lines 31 may be shared between radios 28 if desired. Radio-frequency front end (RFFE) modules may be interposed on one or more radio-frequency transmission lines 31. The radio-frequency front end modules may include substrates, integrated circuits, chips, or packages that are separate from radios 28 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines 31.

Radios 28 may use antenna(s) 34 to transmit and/or receive radio-frequency signals within different frequency bands at radio frequencies (sometimes referred to herein as communications bands or simply as a "bands"). The frequency bands handled by radios 28 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G NR Frequency Range 1 (FR1) bands below 10 GHz, 5G NR Frequency Range 2 (FR2) bands between 20 and 60 GHz, etc.), other centimeter or millimeter wave frequency bands between 10-300 GHz, near-field communications (NFC) frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Each radio 28 may transmit and/or receive radio-frequency signals according to a respective radio access technology (RAT) that determines the physical connection methodology for the components in the corresponding radio. One or more radios 28 may implement multiple RATs if desired. As just one an example, the radios 28 in device 10 may include a UWB radio 28-0 for conveying UWB signals using one or more antennas 34, a Bluetooth (BT) radio 28-1 for conveying BT signals using one or more antennas 34, a Wi-Fi radio 28-3 for conveying WLAN signals using one or more antennas 34, a cellular radio 28-4 for conveying cellular telephone signals using one or more antennas 34 (e.g., in 4G frequency bands, 5G FR1 bands, and/or 5G FR2 bands), an NFC radio 28-5 for conveying NFC signals using one or more antennas 34, and a wireless charging radio 28-6 for receiving wireless charging signals using one or more antennas 34 for charging a battery on device 10. This example is merely illustrative and, in general, radios 28 may include any desired combination of radios for covering any desired combination of RATs.

Radios 28 may use antenna(s) 34 to transmit and/or receive radio-frequency signals to convey wireless communications data between device 10 and external wireless communications equipment (e.g., one or more other devices such as device 10, a wireless access point or base station, etc.). Wireless communications data may be conveyed by radios 28 bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc. Radios 28 may also use antenna(s) 34 to perform spatial ranging operations (e.g., for identifying a distance between device 10 and an external object such as external object 8). Radios 28 that perform spatial ranging operations may include radar circuitry if desired (e.g., frequency modulated continuous wave (FMCW) radar circuitry, OFDM radar circuitry, FSCW radar circuitry, a phase coded radar circuitry, other types of radar circuitry).

During radio-frequency signal transmission, some of the radio-frequency signals transmitted by antenna(s) 34 may be incident upon external objects such as external object 8. External object 8 may be, for example, the body of the user of device 10 or another human or animal. In these scenarios, the amount of radio-frequency energy exposure at external object 8 may be characterized by one or more radio-frequency (RF) energy exposure metrics. The RF exposure (RFE) metrics may include specific absorption rate (SAR) for radio-frequency signals at frequencies less than 6 GHz (in units of W/kg), maximum permissible exposure (MPE) for radio-frequency signals at frequencies greater than 6 GHz (in units of mW/cm$^2$), and total exposure ratio (TER), which combines SAR and MPE.

Regulatory requirements often impose limits on the amount of RF energy exposure permissible for external object 8 within the vicinity of antenna(s) 34 over a specified time period (e.g., an SAR limit and an MPE limit over a corresponding averaging period). Radios 28 that handle radio-frequency signals at frequencies greater than 6 GHz are sometimes referred to herein as MPE radios 28 because these radios 28 may be subject to MPE limits. Radios 28 that handle radio-frequency signals at frequencies less than 6 GHz are sometimes referred to herein as SAR radios 28 because these radios 28 may be subject to SAR limits. Radios 28 that handle signals greater than 6 GHz and signals less than 6 GHz (e.g., a cellular telephone radio 28) are subject to both SAR and MPE limits and are therefore both a SAR radio and an MPE radio.

Wireless circuitry 24 may include RF exposure metric manager 26 for ensuring that radios 28 comply with these regulatory requirements. The components of RF exposure metric manager 26 may be implemented in hardware (e.g., one or more processors, circuit components, logic gates, diodes, transistors, switches, arithmetic logic units (ALUs), registers, application-specific integrated circuits, field-programmable gate arrays, etc.) and/or software on device 10. RF exposure metric manager 26 may sometimes be referred to herein as RF exposure manager 26, RF exposure managing engine 26, RF exposure metric management circuitry 26, RF exposure metric management engine 26, or RF exposure metric management processor 26. RF exposure metric manager 26 may be coupled to each radio 28 over a respective control path 30 (e.g., control path 30-0 may couple RF exposure metric manager 26 to radio 28-0, control path 30-1 may couple RF exposure metric manager 26 to radio 28-1, control path 30-$n$ may couple RF exposure metric manager 26 to radio 28-$n$, etc.).

RF exposure metric manager 26 may generate RF exposure budgets BGT for radios 28 (e.g., a first RF exposure budget BGT0 for radio 28-0, a second RF exposure budget BGT1 for radio 28-1, an (n+1)th RF exposure budget BGTn for radio 28-$n$, etc.). RF exposure metric manager 26 may provide RFE budgets BGT to radios 28 over control paths 30. Each RFE budget BGT may include a corresponding SAR budget BGT$_{SAR}$ and/or a corresponding MPE budget BGT$_{MPE}$ (e.g., depending on whether the radio subject to that budget is subject to SAR and/or MPE limits). Each radio 28 that is subject to SAR limits may receive a respective SAR budget BGT$_{SAR}$ and each radio 28 that is subject to MPE limits may receive a respective MPE budget BGT$_{MPE}$ from RF exposure metric manager 26. Each SAR budget BGT$_{SAR}$ may specify the amount of SAR that may be generated by the corresponding radio 28 in transmitting radio-frequency signals over the regulatory averaging period while still satisfying the overall SAR regulatory limits. Each MPE budget BGT$_{MPE}$ may specify the amount of MPE that may be generated by the corresponding radio 28 in transmitting radio-frequency signals over the regulatory averaging period while still satisfying the overall MPE regulatory limits. The circuitry in radios 28 may adjust the maximum transmit (TX) power level of its transmitted radio-frequency signals (e.g., using a maximum power reduction (MPR) command, etc.) to ensure that the RF exposure budget BGT for that radio remains satisfied over the averaging period.

In some scenarios, each radio or RAT in device 10 is assigned a fixed SAR/MPE budget, such that the distribution of the total available RF exposure budget across RATs remains static over time to meet the overall SAR/MPE regulatory limits on the operation of device 10 (e.g., over the averaging period). In these scenarios, each radio uses look-up tables to derive the maximum transmit power levels allowed for its fixed SAR/MPE budget and then maintains its transmit power level below that maximum transmit power level to satisfy the SAR/MPE limits. However, assigning static SAR/MPE budgets to the radios in this way without considering the radio needs for the current operating state/environment of device 10 results in sub-optimal budget distribution between the radios/RATs. For example, the part of the overall RF exposure budget that is not used by one radio cannot be re-assigned to another radio that may urgently need to transmit at a higher power level or increased duty cycle.

In order to mitigate these issues, RF exposure metric manager 26 may dynamically allocate SAR and MPE budgets to radios 28 over time (e.g., over the averaging period). RF exposure metric manager 26 may dynamically allocate SAR and MPE budgets to radios 28 based on feedback from radios 28. For example, as shown in FIG. 1, each radio 28 may be coupled to RF exposure metric manager 26 over feedback path 32. Each radio 28 may generate a SAR/MPE report RPT that identifies the amount of the assigned SAR and/or MPE budget that was consumed by that radio during different sub-periods (sometimes referred to herein as instantaneous periods) of the averaging period. SAR/MPE reports RPT may sometimes also be referred to herein as SAR/MPE feedback reports RPT, feedback reports RPT, SAR/MPE feedback RPT, feedback RPT, SAR/MPE feedback signals RPT, or feedback signals RPT. Radios 28 may send the SAR/MPE reports RPT to RF exposure metric manager 26 over feedback path 32 (e.g., radio 28-0 may send SAR/MPE report RPT0 to RF exposure metric manager 26, radio 28-1 may send SAR/MPE report RPT1 to RF exposure metric manager 26, radio 28-n may send SAR/MPE report RPTn to RF exposure metric manager 26, etc.). RF exposure metric manager 26 may receive each SAR/MPE report through the active transmission of the reports by radios 28 (e.g., as control signals or other control data) or by querying or retrieving the reports from radios 28 (e.g., by transmitting control signals or commands to the radios instructing the radios to transmit the corresponding report to RF exposure metric manager 26). RF exposure metric manager 26 may generate updated RF exposure budgets BGT for radios 28 based on the received SAR/MPE reports RPT and based on the current or expected communication needs of device 10 to ensure that radios 28 can continue to transmit radio-frequency signals to meet the active and dynamic needs of device 10 while still satisfying the SAR and MPE limits imposed on device 10 over the averaging period. In this way, RF exposure metric manager 26 may assign SAR/MPE budgets across RATs while ensuring an SAR/MPE compliant overall RF exposure across the RATs.

As an example, RF exposure metric manager 26 may include an RF exposure rule database, a total RF exposure calculation engine, and a budget calculation and distribution engine. The RF exposure rule database may be hard-coded or soft-coded into RF exposure metric manager 26 (e.g., in storage circuitry 16 of FIG. 1) and may include a database, data table, or any other desired data structure. The RF exposure rule database may store RF exposure rules associated with the operation of wireless circuitry 24 within different geographic regions. The RF exposure rule database may, for example, store regulatory SAR limits, regulatory MPE limits, and averaging periods $T_{AVG}$ for the SAR limits and MPE limits for one or more geographic regions (e.g., countries, continents, states, localities, municipalities, provinces, sovereignties, etc.) that impose regulatory limits on the amount of RF energy exposure permissible for external object 8 within the vicinity of antenna(s) 34. As an example, the RF exposure rule database may store a first SAR limit, a first MPE limit, and a first averaging period $T_{AVG}$ imposed by the regulatory requirements of a first country, a second SAR limit, a second MPE limit, and a second averaging period $T_{AVG}$ imposed by the regulatory requirements of a second country, etc. The entries of the RF exposure rule database may be stored upon manufacture, assembly, testing, and/or calibration of device 10 and/or may be updated during the operation of device 10 over time (e.g., periodically or in response to a trigger condition such as a software update or the detection that device 10 has entered a new country for the first time).

The total RF exposure calculation engine in RF exposure metric manager 26 may receive SAR/MPE reports RPT from radios 28 over feedback path 32. Each SAR/MPE report RPT may include a corresponding SAR report and/or a corresponding MPE report. For example, the SAR/MPE report RPT0 produced by radio 28-0 of FIG. 1 may include a first SAR report and a first MPE report, the SAR/MPE report RPT1 produced by radio 28-1 may include a second SAR report and a second MPE report, etc. For radios 28 that do not operate at frequencies greater than 6 GHz (e.g., SAR radios 28), the MPE report generated by that radio may be null or empty or that radio 28 may omit an MPE report from its SAR/MPE report RPT. Similarly, for radios 28 that do not operate at frequencies less than 6 GHz (e.g., MPE radios 28), the SAR report generated by that radio may be null or empty or that radio 28 may omit a SAR report from its SAR/MPE report RPT.

The total RF exposure calculation engine may generate (e.g., compute, calculate, identify, produce, etc.) an average consumed SAR value, an average consumed MPE value, and a consumed total exposure ratio value based on the SAR/MPE reports RPT received over feedback path 32, the averaging period $T_{AVG}$ received from the RF exposure rule database, and the SAR limit and the MPE limit received from the RF exposure rule database. The RF exposure rule database may identify a particular averaging period $T_{AVG}$, a particular SAR limit, and a particular MPE limit to send to the total RF exposure calculation engine based on the current geographic location of device 10.

The total RF exposure calculation engine may generate an average SAR value based on the SAR reports in the SAR/MPE reports RPT received over feedback path 32. The average SAR value may be indicative of the average amount of the current SAR budgets consumed by all of the radios 28 in wireless circuitry 24 during the current averaging period $T_{AVG}$. Similarly, the total RF exposure calculation engine may generate an average MPE value based on the MPE reports in the SAR/MPE reports RPT received over feedback path 32. The average MPE value may be indicative of the average amount of the current MPE budgets consumed by all of the radios 28 in wireless circuitry 24 during the current averaging period $T_{AVG}$. The total RF exposure calculation engine may generate a total exposure ratio value indicative of the combined SAR and MPE consumption by all of the radios 28 in wireless circuitry 24 during the current averaging period $T_{AVG}$.

The budget calculation and distribution engine in RF exposure metric manager 26 may generate updated RF exposure budgets BGT for each radio 28 in wireless circuitry 24 based on the average SAR value, the average MPE value, the total exposure ratio value, the SAR limit, and the MPE limit. The budget calculation and distribution engine may also generate the updated RF exposure budgets BGT while taking into account which radios may or may not need to perform more or less transmission at any given time. For example, the budget calculation and distribution engine may generate updated RF exposure budgets BGT based on SAR/MPE distribution policies, SAR/MPE radio transmit (TX) activity factors, SAR/MPE radio statuses, and/or SAR/MPE radio usage ratios. The SAR/MPE distribution policies may identify which SAR radios 28 require SAR budget at a current point in time and which MPE radios 28 require MPE budget at a current point in time (e.g., because the radios already have a wireless connection established with external communication equipment). The SAR/MPE radios 28 that are actively communicating with external communications equipment and conveying a relatively large amount of data may, for example, require more SAR/MPE budget and may be allocated more SAR/MPE budget than the SAR/MPE radios 28 that are not actively communicating with the external communications equipment or that are conveying a relatively low amount of data. The SAR/MPE radio statuses may identify which SAR/MPE radios 28 are active or in an idle or sleep mode at any given time. SAR/MPE radios 28 that are active may, for example, require more SAR/MPE budget than SAR/MPE radios that are idle, inactive, or asleep. The SAR/MPE radio TX activity factors may identify the amount of transmit activity being used or expected to be used by each SAR/MPE radio 28. SAR/MPE radios 28 that have a high amount of actual or expected transmit activity may, for example, require more SAR/MPE budget than SAR/MPE radios that have a relatively small amount of actual or expected transmit activity. The SAR/MPE radio usage ratios may identify how much of past SAR/MPE budgets was actually used by each SAR/MPE radio 28. A SAR/MPE radio 28 that used all or most of its allocated SAR/MPE budget during one or more of the previous instantaneous periods and/or averaging periods may, for example, require more SAR/MPE budget during the next instantaneous period than SAR/MPE radios 28 that used relatively little of its SAR/MPE budget during the previous instantaneous periods. The updated RF exposure budgets BGT may serve to dynamically adjust the amount of SAR/MPE budget provided to each radio within the current averaging period $T_{AVG}$ and/or across multiple averaging periods $T_{AVG}$.

The budget calculation and distribution engine may provide each RF exposure budget BGT to the corresponding radio 28 to be subjected to that RF exposure budget over control paths 30. Each RF exposure budget BGT may include a corresponding SAR budget $BGT_{SAR}$ and/or a corresponding MPE budget $BGT_{MPE}$. For radios 28 that do not operate at frequencies greater than 6 GHz (e.g., SAR radios 28), the MPE budget generated for that radio may be null or empty or the budget calculation and distribution engine may omit an MPE budget from the RF exposure budget for that radio. Similarly, for radios 28 that do not operate at frequencies less than 6 GHz (e.g., MPE radios 28), the SAR budget generated for that radio may be null or empty or the budget calculation and distribution engine may omit an SAR budget from the RF exposure budget for that radio.

Radios 28 may use the updated RF exposure budgets produced by the budget calculation and distribution engine to transmit radio-frequency signals. The radios may produce SAR/MPE reports RPT associated with the transmission of radio-frequency signals using the updated RF exposure budgets. This process may iterate to continue to update the RF exposure budgets provided to each radio over time, thereby allowing RF exposure metric manager 26 to dynamically adjust the amount of SAR and MPE budget provided to each radio based on feedback from previous transmissions by the radio, the SAR and MPE limits imposed by the corresponding regulatory body, and the current or future communications needs of device 10.

The example of FIG. 1 is merely illustrative. While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24). As an example, control circuitry 14 may include baseband circuitry (e.g., one or more baseband processors) or other control circuitry that forms part of radios 28. The baseband circuitry may, for example, access a communication protocol stack on control circuitry 14 (e.g., storage circuitry 20) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer. If desired, the PHY layer operations may additionally or alternatively be performed by radio-frequency (RF) interface circuitry in wireless circuitry 24. In addition, wireless circuitry 24 may include any desired number of antennas 34. Some or all of the antennas 34 in wireless circuitry 24 may be arranged into one or more phased antenna arrays (e.g., for conveying radio-frequency signals over a steerable signal beam). If desired, antenna(s) 34 may be operated using a multiple-input and multiple-output (MIMO) scheme and/or using a carrier aggregation (CA) scheme.

In some scenarios, each radio 28 maintains RFE compliance within its RFE budget BGT by applying a fixed maximum transmit (TX) power limit or by applying TX power averaging. TX power averaging keeps the average (conducted) TX power below a certain TX power limit $P_{LIMIT}$ (e.g., where TX power can occasionally exceed $P_{LIMIT}$ but the average TX power does not exceed $P_{LIMIT}$ over the averaging period $T_{AVG}$). However, TX power limits are radio technology and frequency band dependent. As such, an average TX power cannot be maintained during transitions between radios and frequency bands. In addition, the TX power limit depends on device position (e.g., if the device is at a user's head, on a body, relatively far from the user, etc.). As such, the average TX power cannot be maintained when the device position changes over time.

In order to mitigate these issues while ensuring RFE compliance, each radio 28 may perform time-domain averaging of RFE metrics such as SAR and MPE rather than averaging the conducted TX power on antenna(s) 34. For example, the SAR/MPE budget for radio 28 may be converted into a corresponding target TX power and target duty cycle to be used for uplink (UL) transmission. The radio may measure instantaneous TX power and duty cycle and may convert the TX power back to consumed instantaneous SAR/MPE values. The instantaneous SAR/MPE values may be used for time domain averaging of SAR/MPE. The radio may calculate the remaining SAR/MPE budget based on the averaged SAR/MPE and may adjust TX power level and duty cycle to maintain the averaged SAR/MPE within the provided overall budget.

Figure 2:
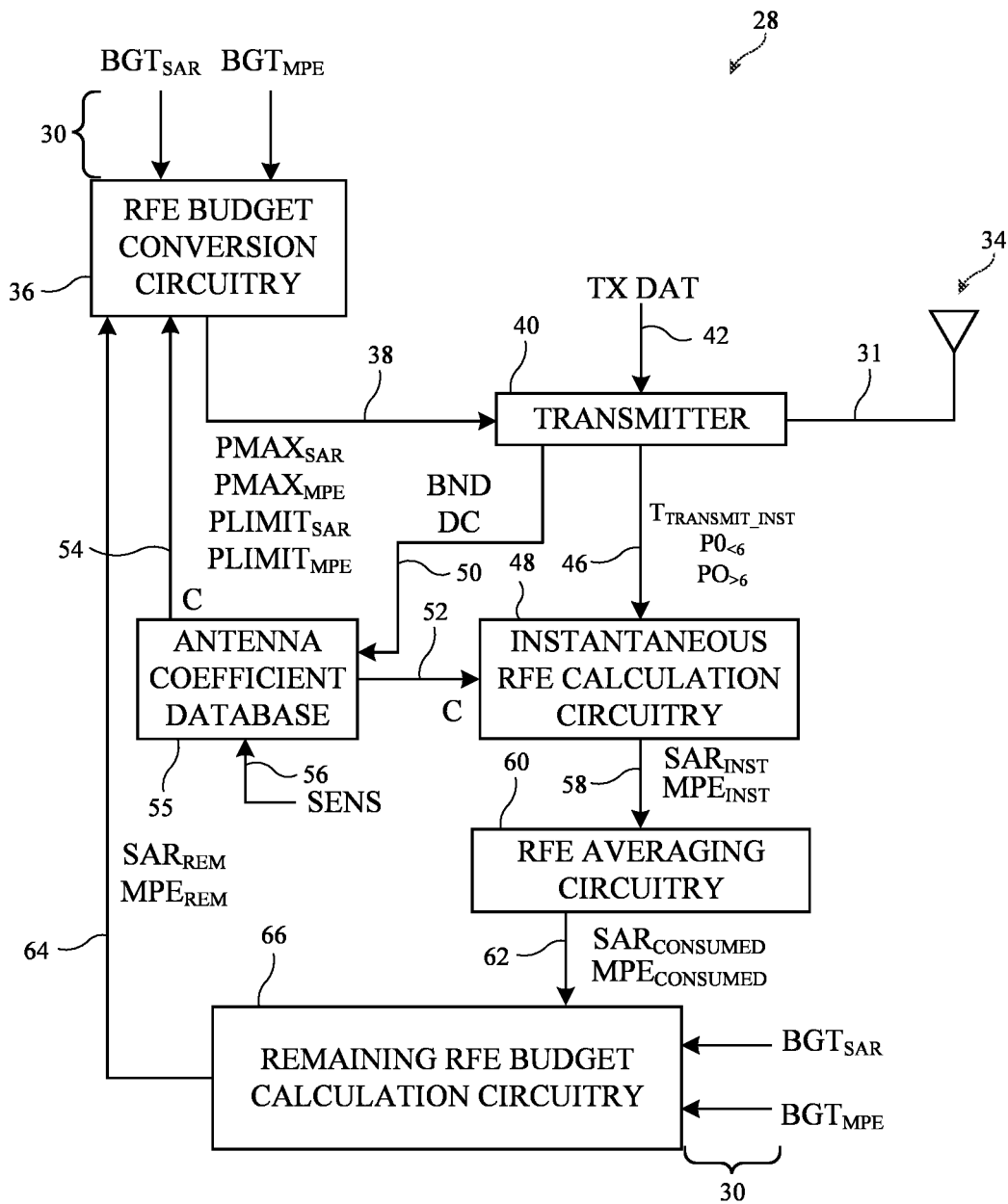
FIG. 2 is a circuit block diagram of an illustrative radio having circuitry for managing RFE compliance subject to RFE budgets in accordance with some embodiments.

FIG. 2 is a circuit block diagram showing how a given radio 28 may perform time-domain averaging of SAR/MPE for maintaining RFE compliance without performing time-domain averaging of conducted TX power. As shown in FIG. 2, radio 28 may include RFE budget conversion circuitry 36, transmitter 40, antenna coefficient database 55, instantaneous RFE calculation circuitry 48, RFE averaging circuitry 60, and remaining RFE budget calculation circuitry 66. RFE budget conversion circuitry 36 may sometimes be referred to herein as RFE budget converter 36 or RFE budget conversion engine 36. Transmitter 40 may sometimes be referred to herein as transmitter circuitry 40. Instantaneous RFE calculation circuitry 48 may sometimes be referred to herein as instantaneous RFE calculator 48 or instantaneous RFE calculation engine 48. RFE averaging circuitry 60 may sometimes be referred to herein as RFE averager 60 or RFE averaging engine 60. Remaining RFE budget calculation circuitry 66 may sometimes be referred to herein as remaining RFE budget calculator 66 or remaining RFE budget calculation engine 66. The components of RFE budget conversion circuitry 36, instantaneous RFE calculation circuitry 48, RFE averaging circuitry 60, and remaining RFE budget calculation circuitry 66 may be implemented in hardware (e.g., using one or more processors, circuit components, logic gates, diodes, transistors, switches, arithmetic logic units (ALUs), registers, application-specific integrated circuits, field-programmable gate arrays, etc.) and/or software on device 10. Antenna coefficient database 55 may include a database, data tables, or any other desired data structure (e.g., on storage circuitry 16 of FIG. 1). If desired, RFE budget conversion circuitry 36, instantaneous RFE calculation circuitry 48, RFE averaging circuitry 60, remaining RFE budget calculation circuitry 66, and/or antenna coefficient database 55 may be implemented on baseband circuitry (e.g., a baseband processor) in radio 28.

RFE budget conversion circuitry 36 may have an input coupled to control paths 30. RFE budget conversion circuitry 36 may have an output coupled to transmitter 40 over control path 38. Transmitter 40 may have an output coupled to a corresponding antenna 34 over radio-frequency transmission line 31. Transmitter 40 may receive transmit data TXDAT over data path 42 (e.g., from an applications processor on control circuitry 14, from baseband circuitry or a baseband processor on radio 28, etc.). Transmit data TXDAT may include application data, text data, message data, web data, voice data, video data, or any other desired data for transmission to external wireless communications equipment (e.g., within the data payload of data packets transmitted by transmitter 40). Transmitter 40 may include upconverter (e.g., mixer) circuitry, clocking circuitry, voltage-controlled oscillator circuitry, modulator circuitry, synthesizer circuitry, signal generator circuitry, analog-to-digital converter (ADC) circuitry, filter circuitry, switching circuitry, amplifier circuitry (e.g., one or more power amplifiers), and/or any other desired circuitry for transmitting radio-frequency signals over antenna 34 (e.g., radio-frequency signals that include transmit data TXDAT).

Transmitter 40 may be coupled to antenna coefficient database 55 over control path 50. Transmitter 40 may be coupled to instantaneous RFE calculation circuitry 48 over control path 46. Instantaneous RFE calculation circuitry 48 may have a first input coupled to antenna coefficient database 55 over control path 52 and may have a second input coupled to transmitter 40 over control path 46. Instantaneous RFE calculation circuitry 48 may have an output coupled to RFE averaging circuitry 60 over control path 58. RFE averaging circuitry 60 may have an output coupled to remaining RFE budget calculation circuitry 66 over control path 62 (e.g., instantaneous RFE calculation circuitry 48 may be coupled in series between transmitter 40 and RFE averaging circuitry 60 and RFE averaging circuitry 60 may be coupled in series between instantaneous RFE calculation circuitry 48 and remaining RFE budget calculation circuitry 66). Remaining RFE budget calculation circuitry 66 may have a first input coupled to RFE averaging circuitry 60 over control path 62 and may have a second input coupled to control paths 30. Remaining RFE budget calculation circuitry 66 may have an output coupled to RFE budget conversion circuitry 36 over control path 64. RFE budget conversion circuitry 36 may also have an input coupled to antenna coefficient database 55 over control path 54.

Antenna coefficient database 55 may store one or more antenna coefficients C. Antenna coefficients C may map conducted TX power to RFE metrics such as SAR/MPE produced by each of the antennas 34 on device 10 under a variety of operating conditions. There may be different antenna coefficients C for different antennas 34, different radio access technologies, different frequency bands, duty cycles, and/or different device positions. Antenna coefficients C may be specific for the design of device 10 and may be derived from laboratory measurements during device design, manufacture, assembly, calibration, and/or testing prior to storage in antenna coefficient database 55. Antenna coefficients C may, for example, be calculated from the measured ratio between conducted TX power and the SAR/MPE caused by the transmission for each antenna 34 under different radio access technologies, frequency bands, duty cycles, and/or device positions. As an example, antenna coefficient database 55 may store a first antenna coefficient C that corresponds to transmission by a first antenna 34 using a first frequency band and first duty cycle when the device is held in a first position (e.g., up to a user's head), a second antenna coefficient C that corresponds to transmission by the first antenna 34 using the first frequency band and the first duty cycle when the device is held in a second position (e.g., on a different portion of the user's body), a third antenna coefficient C that corresponds to transmission by the first antenna 34 using a second frequency band and the first duty cycle when the device is held in the first position, a third antenna coefficient C that corresponds to transmission by a second antenna 34 using the second frequency band and the first duty cycle when the device is held in the second position, a fourth antenna coefficient C that corresponds to transmission by the first antenna using the second frequency band and a second duty cycle when the device is held in the first position, etc. If desired, antenna coefficient database 55 may be updated over time.

Antenna coefficient database 55 may provide the applicable antenna coefficient C for any given transmission period to RFE budget conversion circuitry 36 over control path 54 and to instantaneous RFE calculation circuitry 48 over control path 52. If desired, transmitter 40 may provide transmission information to antenna coefficient database 55 over control path 50 (or to a memory controller or other controller that reads antenna coefficient values C from antenna coefficient database 55). The transmission information may include information identifying which of the antennas 34 on device 10 is being used by transmitter 40 for transmission (e.g., the active antenna), information identifying the frequency band BND for transmission, and information identifying the duty cycle DC used for the transmission. Antenna coefficient database 55 may also receive sensor data SENS over control path 56. Sensor data SENS may be produced by one or more sensors in input/output devices 22 (FIG. 1). Sensor data SENS may, for example, be indicative of whether device 10 is being held up to a user's head, on a different portion of the user's body, away from the user, etc. Antenna coefficient database 55 may provide the applicable antenna coefficient C (e.g., the stored antenna coefficient C that maps conducted TX power to SAR/MPE produced by the active antenna 34 during transmission by transmitter 40 using duty cycle DC in frequency band BND when device 10 is being held in the position identified by sensor data SENS) to RFE budget conversion circuitry 36 over control path 54 and to instantaneous RFE calculation circuitry 48 over control path 52.

RFE budget conversion circuitry 36 and remaining RFE budget calculation circuitry 66 may receive the RFE budget BGT assigned to radio 28 by RF exposure metric manager 26 (FIG. 1) over control paths 30. RFE budget BGT may include SAR budget $BGT_{SAR}$ and/or MPE budget $BGT_{MPE}$. An example in which radio 28 is both a SAR radio and an MPE radio (e.g., in which radio 28 is a cellular radio that transmits signals at frequencies greater than 6 GHz and less than 6 GHz) is described herein for the purpose of illustration. However, if desired, radio 28 may only transmit radio-frequency signals at frequencies less than 6 GHz (in which case radio 28 need only receive SAR budget $BGT_{SAR}$) or may only transmit radio-frequency signals at frequencies greater than 6 GHz (in which case radio 28 need only receive MPE budget $BGT_{MPE}$). In examples where radio 28 only transmits radio-frequency signals at frequencies less than 6 GHz, the operations of radio 28 described herein as being performed for both SAR and MPE compliance may only be performed for SAR compliance. In examples where radio 28 only transmits radio-frequency signals at frequencies greater than 6 GHz, the operations of radio 28 described herein as being performed for both SAR and MPE compliance may only be performed for MPE compliance.

Radio 28 may transmit radio-frequency signals during the regulatory averaging period $T_{AVG}$. Averaging period $T_{AVG}$ is determined by the regulatory body governing the current location of device 10 and is stored in the RF exposure rule database on RF exposure metric manager 26 of FIG. 1. Averaging period $T_{AVG}$ may sometimes also be referred to as averaging window $T_{AVG}$. Averaging period $T_{AVG}$ may be on the order of a few seconds, 1 second, 4 seconds, 5 seconds, 10-60 seconds, 5-20 seconds, 5-60 seconds, 60 seconds, 30 seconds, greater than 60 seconds, etc. Each averaging period $T_{AVG}$ may be divided into a series of instantaneous periods (sometimes referred to herein as sub-windows or subperiods of averaging period $T_{AVG}$). While referred to herein as "instantaneous" periods, the instantaneous periods have a finite duration that is less than the duration of averaging period $T_{AVG}$. Each instantaneous period may be, for example, 1 second, 100 ms, between 100 ms and 1 second, between 10 ms and 1 second, less than 100 ms, 10 ms, between 1 and 100 ms, between 5 ms and 20 ms, between 1 ms and 100 ms, etc. The duration of the instantaneous period may be configurable (adjustable) if desired. For example, RF exposure metric manager 26 (FIG. 1) may adjust the duration of the instantaneous period to scale according to the applicable use case.

At the beginning of a given averaging period $T_{AVG}$ (e.g., during the first instantaneous period of averaging period $T_{AVG}$), RFE budget conversion circuitry 36 may generate a maximum transmit power level $PMAX_{SAR}$ based on SAR budget $BGT_{SAR}$ and the current antenna coefficient(s) C received from antenna coefficient database 55. RFE budget conversion circuitry 36 may additionally or alternatively generate a maximum transmit power level $PMAX_{MPE}$ based on MPE budget $BGT_{MPE}$ and the current antenna coefficient(s) C received from antenna coefficient database 55.

RFE budget conversion circuitry 36 may generate (e.g., compute, produce, calculate, derive, deduce, estimate, identify, etc.) maximum transmit power level $PMAX_{SAR}$ according to equation 1 and/or may generate maximum transmit power level $PMAX_{MPE}$ according to equation 2, for example.

$$PMAX_{SAR} = \frac{C1}{BGT_{SAR}} \quad (1)$$

$$PMAX_{MPE} = \frac{C2}{BGT_{MPE}} \quad (2)$$

In equation 1, C1 is the current antenna coefficient C provided by antenna coefficient database 55 and corresponding to transmission by transmitter 40 in a frequency band BND at frequencies less than 6 GHz using a selected antenna 34. In equation 2, C2 is the current antenna coefficient C provided by antenna coefficient database 55 and corresponding to transmission by transmitter 40 in a frequency band BND at frequencies greater than 6 GHz using the selected antenna 34. RFE budget conversion circuitry 36 may include one or more dividers for generating $PMAX_{SAR}$ and $PMAX_{MPE}$, for example. Maximum transmit power levels $PMAX_{SAR}$ and/or $PMAX_{MPE}$ may be scaled down for duty cycles DC that are less than 100% (e.g., where antenna coefficients C1 and/or C2 correspond to the duty cycle less than 100% that is used). RFE budget conversion circuitry 36 may pass maximum transmit power levels $PMAX_{SAR}$ and/or $PMAX_{MPE}$ to transmitter 40 over control path 38.

Transmitter 40 may transmit radio-frequency signals (e.g., radio-frequency signals that include transmit data TXDAT) over antenna 34 subject or pursuant to (e.g., based on) maximum transmit power levels $PMAX_{SAR}$ and/or $PMAX_{MPE}$ (e.g., during the current instantaneous period). Transmitter 40 may identify (e.g., generate, produced, retrieve, compute, calculate, etc.) the amount of conducted TX power transmitted by transmitter 40 and antenna 34 at frequencies less than 6 GHz ($P0_{<6}$) and/or the amount of conducted TX power transmitted by transmitter 40 and antenna 34 at frequencies greater than 6 GHz ($P0_{>6}$). Transmitter 40 may identify conducted TX powers $P0_{<6}$ and $P0_{>6}$ using its known transmit power, the duration of the current transmit instance (e.g., within the instantaneous period) $T_{TRANSMIT\_INST}$, and the applicable antenna coefficient(s) C. Additionally or alternatively, transmitter 40 may include power measurement circuitry that actively measures conducted TX powers $P0_{<6}$ and/or $P0_{>6}$ from the transmitted radio-frequency signals. $T_{TRANSMIT\_INST}$ may be equal to the duration of one radio time slot used by transmitter 40, as an example. Transmitter 40 may pass $T_{TRANSMIT\_INST}$, $P0_{<6}$, and $P0_{>6}$ to instantaneous RFE calculation circuitry 48 over control path 46.

Instantaneous RFE calculation circuitry 48 may map the conducted TX power $P0_{<6}$ onto the underlying SAR produced by transmitter 40 during the current instantaneous period (sometimes referred to herein as instantaneous SAR) and/or may map the conducted TX power $P0_{>6}$ onto the underlying MPE produced by transmitter 40 during the current instantaneous period (sometimes referred to herein as instantaneous MPE). In other words, instantaneous RFE calculation circuitry 48 may generate (e.g., compute, calculate, produce, derive, deduce, estimate, identify, etc.) an instantaneous SAR value $SAR_{INST}$ based on conducted TX power $P0_{<6}$, the current antenna coefficient C1 received from antenna coefficient database 55, and $T_{TRANSMIT\_INST}$ and/or may generate an instantaneous MPE value $MPE_{INST}$ based on conducted TX power P0$_{>6}$, the current antenna coefficient C2 received from antenna coefficient database 55, and T$_{TRANSMIT\_INST}$. For example, instantaneous RFE calculation circuitry 48 may generate instantaneous SAR value SAR$_{INST}$ according to equation 3 and/or may generate instantaneous MPE value MPE$_{INST}$ according to equation 4.

$$SAR_{INST} = C1 * P0_{<6} * T_{TRANSMIT\_INST} \quad (3)$$

$$MPE_{INST} = C2 * P0_{>6} * T_{TRANSMIT\_INST} \quad (4)$$

Instantaneous RFE calculation circuitry 48 may include one or more multipliers for generating instantaneous SAR value SAR$_{INST}$ and/or instantaneous MPE value MPE$_{INST}$, for example. Conducted TX powers P0$_{<6}$ and P0$_{>6}$ may be in units of mW, for example. Antenna coefficient C1 may map conducted power in units of mW to SAR in units of W/kg. Instantaneous SAR value SAR$_{INST}$ is therefore in units of Ws/kg or J/kg. Antenna coefficient C2 may map conducted power in units of mW to MPE in units of mW/cm$^2$. Instantaneous MPE value MPE$_{INST}$ is therefore in units of mWs/cm$^2$ or mJ/cm$^2$. As an example, when transmitter 40 has an output power P$_{OUT}$ of 18 dBm and produces a conducted power P0$_{<6}$=63 mW when antenna coefficient C1=1/63 g, instantaneous RFE calculation circuitry 48 may generate a SAR value equal to 6 mw*(1/63 g)=1 W/kg. Instantaneous RFE calculation circuitry 48 may multiply this SAR value by T$_{TRANSMIT\_INST}$ to obtain instantaneous SAR value SAR$_{INST}$. RFE calculation circuitry 48 may provide instantaneous SAR value SAR$_{INST}$ and/or instantaneous MPE value MPE$_{INST}$ to RFE averaging circuitry 60 over control path 58.

RFE averaging circuitry 60 may store the instantaneous SAR values SAR$_{INST}$ and/or the instantaneous MPE values MPE$_{INST}$ generated by instantaneous RFE calculation circuitry 48 for each instantaneous period of the current averaging period T$_{AVG}$. RFE averaging circuitry 60 may average the instantaneous SAR value SAR$_{INST}$ generated by instantaneous RFE calculation circuitry 48 during the current instantaneous period with each of the instantaneous SAR values SAR$_{INST}$ generated by instantaneous RFE calculation circuitry 48 during each of the previous instantaneous periods of the current averaging period T$_{AVG}$ to produce a consumed (average) SAR value SAR$_{CONSUMED}$. Additionally or alternatively, RFE averaging circuitry 60 may average the instantaneous MPE value MPE$_{INST}$ generated by instantaneous RFE calculation circuitry 48 during the current instantaneous period with each of the instantaneous MPE values MPE$_{INST}$ generated by instantaneous RFE calculation circuitry 48 during each of the previous instantaneous periods of the current averaging period T$_{AVG}$ to produce a consumed (average) MPE value MPE$_{CONSUMED}$. For example, RFE averaging circuitry 60 may generate (e.g., produce, calculate, identify, compute, deduce, estimate, etc.) consumed SAR value SAR$_{CONSUMED}$ according to equation 5 and/or may generate consumed MPE value MPE$_{CONSUMED}$ according to equation 6.

$$SAR_{CONSUMED} = \frac{\sum_{i=1}^{n} SAR_{INST}}{T_{ELAPSED}} \quad (5)$$

$$MPE_{CONSUMED} = \frac{\sum_{i=1}^{n} MPE_{INST}}{T_{ELAPSED}} \quad (6)$$

In equations 5 and 6, "i" is an index, "n" is the number of instantaneous periods in the current averaging period T$_{AVG}$ that have already elapsed (e.g., the number of instantaneous SAR values SAR$_{INST}$ already gathered for the current averaging period T$_{AVG}$), and T$_{ELAPSED}$ is the portion of averaging period T$_{AVG}$ that has already elapsed (e.g., n times the duration of the instantaneous periods in averaging period T$_{AVG}$). RFE averaging circuitry 60 may include one or more dividers and one or more adders for generating consumed SAR value SAR$_{CONSUMED}$ and/or consumed MPE value MPE$_{CONSUMED}$, for example. RFE averaging circuitry 60 may pass consumed SAR value SAR$_{CONSUMED}$ and/or consumed MPE value MPE$_{CONSUMED}$ to remaining RFE budget calculation circuitry 66 over control path 62.

Remaining RFE budget calculation circuitry 66 may generate (e.g., produce, deduce, determine, identify, estimate, identify, calculate, compute, etc.) a remaining SAR budget SAR$_{REM}$ based on the consumed SAR value SAR$_{CONSUMED}$ generated by RFE averaging circuitry 60 and the SAR budget BGT$_{SAR}$ received from RF exposure metric manager 26 over control paths 30. Additionally or alternatively, remaining RFE budget calculation circuitry 66 may generate a remaining MPE budget MPE$_{REM}$ based on the consumed MPE value MPE$_{CONSUMED}$ generated by RFE averaging circuitry 60 and the MPE budget BGT$_{MPE}$ received from RF exposure metric manager 26 over control paths 30. For example, remaining RFE budget calculation circuitry 66 may generate remaining SAR budget SAR$_{REM}$ according to equation 7 and/or may generate remaining MPE budget MPE$_{REM}$ according to equation 8.

$$SAR_{REM} = \frac{BGT_{SAR} * T_{AVG} - S_{CONSUMED} * T_{ELAPSED}}{T_{REM}} \quad (7)$$

$$MPE_{REM} = \frac{BGT_{MPE} * T_{AVG} - MPE_{CONSUMED} * T_{ELAPSED}}{T_{REM}} \quad (8)$$

In equations 7 and 8, T$_{REM}$ is portion of averaging period T$_{AVG}$ that has not yet elapsed (e.g., where T$_{REM}$=T$_{AVG}$−T$_{ELAPSED}$). Remaining RFE budget calculation circuitry 66 may include one or more dividers, one or more multipliers, and one or more adders for generating remaining SAR budget SAR$_{REM}$ and/or remaining MPE budget MPE$_{REM}$, for example. Remaining RFE budget calculation circuitry 66 may provide remaining SAR budget SAR$_{REM}$ and/or remaining MPE budget MPE$_{REM}$ to RFE budget conversion circuitry 36 over control path 64.

Consider an example in which the SAR consumed within the first three seconds of a four-second averaging period T$_{AVG}$ exceeds a SAR budget BGT$_{SAR}$ of 1 W/kg. In this example, for the remaining 1 second, only a reduced budget of (1 W/kg*4 s−1.2 W/kg*3 s)/(1 s)=0.4 W/kg is available (e.g., as remaining SAR budget SAR$_{REM}$) to keep SAR averaged over the four-second averaging period within SAR budget BGT$_{SAR}$. In another example where the SAR consumed in the first three seconds of a four-second averaging period T$_{AVG}$ is less than a SAR budget BGT$_{SAR}$ of 1 W/kg, a remaining SAR budget SAR$_{REM}$ equal to (1 W/kg*4 s−0.7 W/kg*3 s)/(1 s)=1.9 W/kg is available. Even when using this higher SAR during the remaining one second of the averaging period, the total SAR averaged over the four second averaging period remains within SAR budget BGT$_{SAR}$.

After the first instantaneous period of the current averaging period T$_{AVG}$, RFE budget conversion circuitry 36 may generate maximum transmit power level PLIMIT$_{SAR}$ based on remaining SAR budget SAR$_{REM}$ and antenna coefficient C1 (e.g., by replacing SAR budget BGT$_{SAR}$ with remaining SAR budget SAR$_{REM}$ in equation 1). Additionally or alternatively, RFE budget conversion circuitry 36 may generate maximum transmit power level $PLIMIT_{MPE}$ based on remaining MPE budget $MPE_{REM}$ and antenna coefficient C2 (e.g., by replacing MPE budget $BGT_{MPE}$ with remaining MPE budget $MPE_{REM}$ in equation 2). RFE budget conversion circuitry 36 may provide maximum transmit power level $PLIMIT_{SAR}$ and/or maximum transmit power level $PLIMIT_{MPE}$ to transmitter 40 over control path 38. For the instantaneous periods after the first instantaneous period of the current averaging period, transmitter 40 may transmit radio-frequency signals subject or pursuant to (e.g., based on) maximum transmit power level $PLIMIT_{SAR}$ (rather than maximum transmit power level $PMAX_{SAR}$) for radio-frequency signals at frequencies less than 6 GHz and may transmit radio-frequency signals subject or pursuant to (e.g., based on) maximum transmit power level $PLIMIT_{MPE}$ (rather than maximum transmit power level $PMAX_{MPE}$) for radio-frequency signals at frequencies greater than 6 GHz.

In this way, radio 28 may perform time-domain averaging of SAR and/or MPE (rather than time-domain averaging conducted TX power) to iteratively adjust the remaining SAR and/or MPE budgets for the radio to ensure RFE compliance over the averaging period. Time-domain averaging SAR and/or MPE in this way may also lead to improved and simplified handling of transient scenarios relative to time-averaging conducted TX power. For example, averaged SAR/MPE may be maintained as the active frequency band BND or radio access technology changes over time. Merely averaging conducted TX power cannot maintain a time-domain average of SAR/MPE because the mapping between SAR/MPE and allowed maximum transmit power level is dependent upon frequency band and radio access technology. Averaged SAR/MPE may similarly be maintained as changes in RF exposure conditions occur over time, such as when the device moves from away from a user's body to on the user's body to near the user's head. Time-domain averaging SAR and/or MPE in this way may also allow for budget sharing across radio access technologies. For example, SAR/MPE budget may be shared between cellular, WLAN, Bluetooth, UWB, and/or other radio access technologies because averaged SAR/MPE values are of the same quantity, whereas averaged conducted TX power is still dependent upon radio access technology, frequency band, and active antenna.

Figure 3:
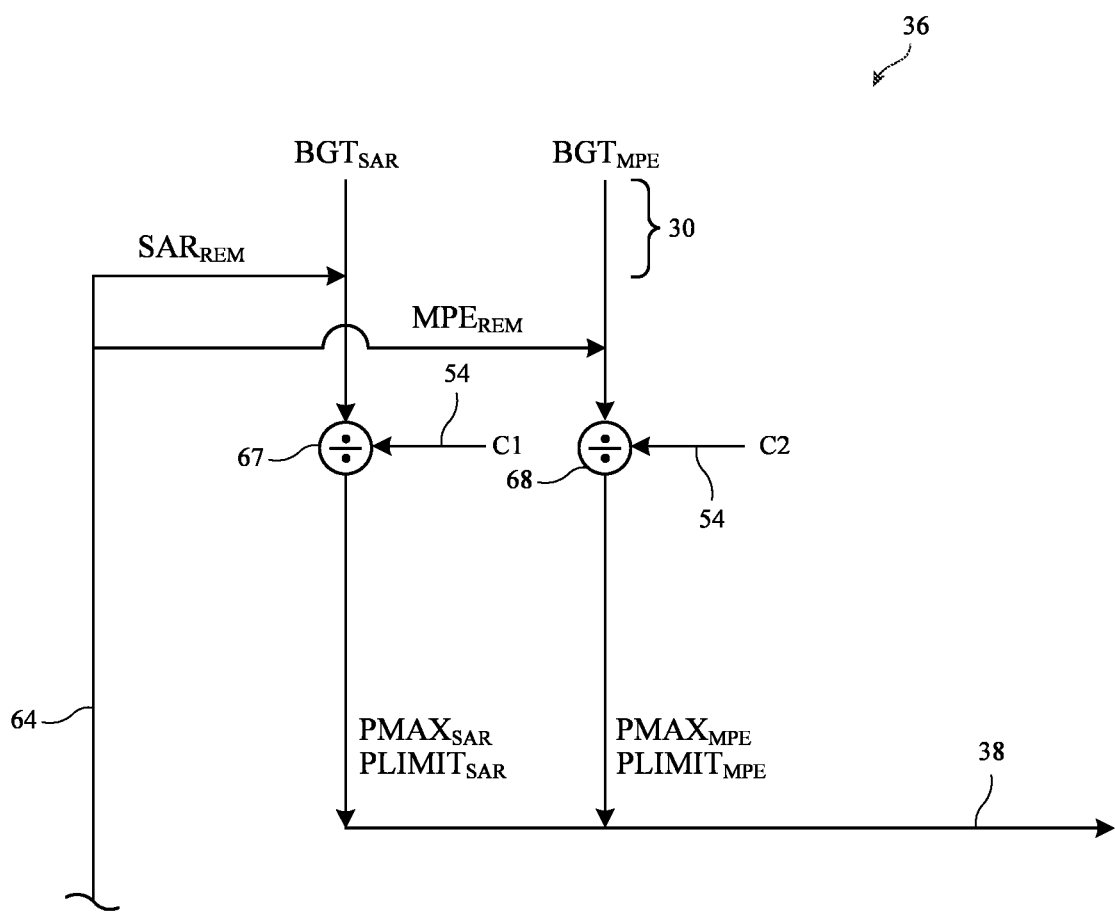
FIG. 3 is a circuit block diagram of illustrative RFE budget conversion circuitry in a radio in accordance with some embodiments.

FIG. 3 is a circuit block diagram of RFE budget conversion circuitry 36 in one illustrative example. As shown in FIG. 3, RFE budget conversion circuitry 36 may include divider circuitry such as a first divider 67 and a second divider 68. Dividers 67 and 68 may each have a first input coupled to control paths 30 and 64. Divider 67 may have a second input that receives antenna coefficient C1 from antenna coefficient database 55 (e.g., over control path 54 of FIG. 2). Divider 68 may have a second input that receives antenna coefficient C2 from antenna coefficient database 55. Divider 67 or 68 may be omitted in examples where radio 28 only transmits radio-frequency signals at less than 6 GHz or only transmits radio-frequency signals at greater than 6 GHz.

During a first instantaneous period of a current averaging period $T_{AVG}$, divider 67 may divide the SAR budget $BGT_{SAR}$ received over control paths 30 by antenna coefficient C1 to generate (e.g., produce, compute, calculate, etc.) maximum transmit power level $PMAX_{SAR}$ (e.g., according to equation 1). During the first instantaneous period of the current averaging period $T_{AVG}$, divider 68 may divide the MPE budget $BGT_{MPE}$ received over control paths 30 by antenna coefficient C2 to generate maximum transmit power level $PMAX_{MPE}$ (e.g., according to equation 2). During subsequent instantaneous periods of the current averaging period $T_{AVG}$, divider 67 may divide the remaining SAR budget $SAR_{REM}$ received over control path 64 by antenna coefficient C1 to generate maximum transmit power level $PLIMIT_{SAR}$ and/or divider 68 may divide the remaining MPE budget $MPE_{REM}$ received over control path 64 by antenna coefficient C2 to generate maximum transmit power level $PLIMIT_{MPE}$. Divider 67 may output maximum transmit power levels $PMAX_{SAR}$ and $PLIMIT_{SAR}$ and divider 68 may output maximum transmit power levels $PMAX_{MPE}$ and $PLIMIT_{MPE}$ onto control path 38. If desired, the same divider may be used to produce the maximum transmit power levels for both MPE and SAR.

Figure 4:
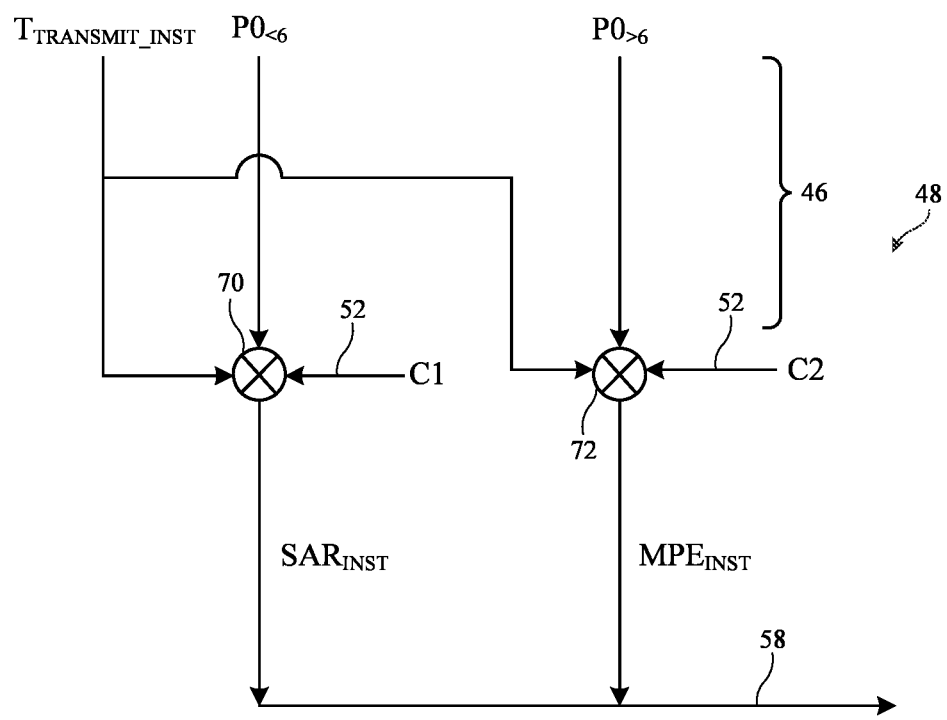
FIG. 4 is a circuit block diagram of illustrative instantaneous RFE calculation circuitry in a radio in accordance with some embodiments.

FIG. 4 is a circuit block diagram of instantaneous RFE calculation circuitry 48 in one illustrative example. As shown in FIG. 4, instantaneous RFE calculation circuitry 48 may include multiplier circuitry such as a first multiplier 70 and a second multiplier 72. Multipliers 70 and 72 may each have first and second inputs coupled to control path 46. Multiplier 70 may have a third input that receives antenna coefficient C1 from antenna coefficient database 55 (e.g., over control path 52 of FIG. 2). Multiplier 72 may have a third input that receives antenna coefficient C2 from antenna coefficient database 55. Multiplier 70 or 72 may be omitted in examples where radio 28 only transmits radio-frequency signals at less than 6 GHz or only transmits radio-frequency signals at greater than 6 GHz.

During each instantaneous period of the current averaging period $T_{AVG}$, multiplier 70 may multiply the conducted transmit power $P0_{<6}$ received from transmitter 40 by the time $T_{TRANSMIT\_INST}$ received from transmitter 40 and by the antenna coefficient C1 received from antenna coefficient database 55 to produce generate (e.g., produce, compute, calculate, etc.) instantaneous SAR value $SAR_{INST}$. Additionally or alternatively, multiplier 72 may multiply the conducted transmit power $P0_{>6}$ received from transmitter 40 by the time $T_{TRANSMIT\_INST}$ received from transmitter 40 and by the antenna coefficient C2 received from antenna coefficient database 55 to produce generate instantaneous MPE value $MPE_{INST}$. Multiplier 70 may output instantaneous SAR value $SAR_{INST}$ and multiplier 72 may output instantaneous MPE value $MPE_{INST}$ onto control path 58. If desired, the same multiplier may be used to produce both instantaneous SAR value $SAR_{INST}$ and instantaneous MPE value $MPE_{INST}$.

Figure 5:
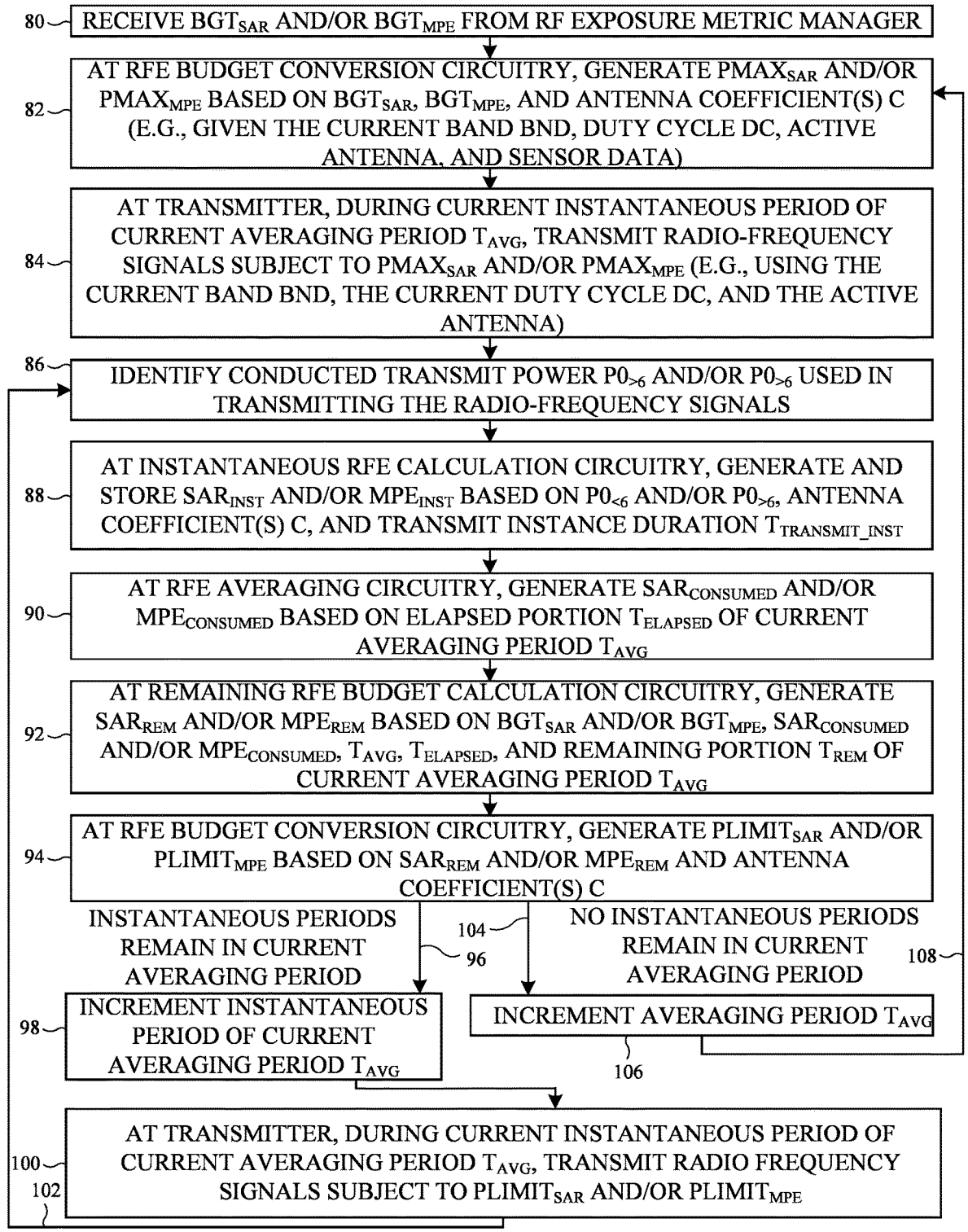
FIG. 5 is a flow chart of illustrative operations involved in using a radio to maintain RFE compliance by time averaging RFE metrics in accordance with some embodiments.

FIG. 5 is a flow chart of illustrative operations that may be performed by a given radio 28 on device 10 to maintain RFE compliance by time-averaging SAR and/or MPE (e.g., using the components of FIGS. 2-4). At operation 80, RFE budget conversion circuitry 36 and remaining RFE budget calculation circuitry 66 on radio 28 may receive SAR budget $BGT_{SAR}$ and/or MPE budget $BGT_{MPE}$ from RF exposure metric manager 26 (FIG. 1). Radio 28 may also receive information identifying the current averaging period $T_{AVG}$ from RF exposure metric manager 26.

At operation 82, during a first instantaneous period of the current averaging period $T_{AVG}$, RFE budget conversion circuitry 82 may generate maximum transmit power level $PMAX_{SAR}$ based on SAR budget $BGT_{SAR}$ and antenna coefficient C1 (e.g., according to equation 1). Additionally or alternatively, RFE budget conversion circuitry 82 may generate maximum transmit power level $PMAX_{MPE}$ based on MPE budget $BGT_{MPE}$ and antenna coefficient C2 (e.g., according to equation 2). Antenna coefficient database 55 may provide antenna coefficients C (e.g., antenna coefficient C1 and/or C2) to instantaneous RFE calculation circuitry 48 and RFE budget conversion circuitry 36 that correspond to the active antenna 34, the duty cycle DC for transmission, the frequency band BND and radio access technology for transmission, and the current position or orientation of device 10 (e.g., as identified by sensor data SENS of FIG. 2), for example. RFE budget conversion circuitry 82 may provide maximum transmit power level $PMAX_{SAR}$ and/or maximum transmit power level $PMAX_{MPE}$ to transmitter 40.

At operation 84, during the first instantaneous period of the current averaging period $T_{AVG}$, transmitter 40 may transmit radio-frequency signals subject to maximum transmit power levels $PMAX_{SAR}$ and/or $PMAX_{MPE}$. Transmitter 40 may transmit the radio-frequency signals in frequency band BND, using the duty cycle DC, and using the active antenna 34 corresponding to the antenna coefficients C1 and/or C2 received by RFE budget conversion circuitry 36.

At operation 86, transmitter 40 may identify the conducted TX powers $PO_{<6}$ and/or $PO_{>6}$ produced by transmitter 40 and antenna 34 in transmitting the radio-frequency signals during the current instantaneous period of the current averaging period $T_{AVG}$ (e.g., as produced while performing operation 84 during a first iteration of the operations of FIG. 5). Transmitter 40 may also identify the time $T_{TRANSMIT\_INST}$ in which the radio-frequency signals were transmitted for the current instantaneous period. Transmitter 40 may provide $T_{TRANSMIT\_INST}$, $PO_{<6}$, and/or $PO_{>6}$ to instantaneous RFE calculation circuitry 48.

At operation 88, instantaneous RFE calculation circuitry 48 may generate instantaneous SAR value $SAR_{INST}$ based on conducted TX power $PO_{<6}$, $T_{TRANSMIT\_INST}$, and antenna coefficient C1 (e.g., according to equation 3). Additionally or alternatively, instantaneous RFE calculation circuitry 48 may generate instantaneous MPE value $MPE_{INST}$ based on conducted TX power $PO_{>6}$, $T_{TRANSMIT\_INST}$, and antenna coefficient C2 (e.g., according to equation 4). Instantaneous RFE calculation circuitry 48 may store the instantaneous SAR value $SAR_{INST}$ and/or instantaneous MPE value $MPE_{INST}$ (e.g., at RFE averaging circuitry 60) for the current instantaneous period of the current averaging period $T_{AVG}$ for use during subsequent processing. In this way, the instantaneous SAR values $SAR_{INST}$ and/or the instantaneous MPE values $MPE_{INST}$ may be accumulated and stored for averaging by RFE averaging circuitry 60 over the current averaging period $T_{AVG}$.

At operation 90, RFE averaging circuitry 90 may generate consumed SAR value $SAR_{CONSUMED}$ by averaging the instantaneous SAR value $SAR_{INST}$ produced for the current instantaneous period (e.g., for the current iteration of operations 86-94 of FIG. 5) with each of the instantaneous SAR values $SAR_{INST}$ that have already been generated and stored during previous instantaneous periods of the current averaging period $T_{AVG}$ (e.g., according to equation 5). Additionally or alternatively, RFE averaging circuitry 90 may generate consumed MPE value $MPE_{CONSUMED}$ by averaging the instantaneous MPE value $MPE_{INST}$ produced for the current instantaneous period (e.g., for the current iteration of operations 86-94 of FIG. 5) with each of the instantaneous MPE values $MPE_{INST}$ that have already been generated and stored during previous instantaneous periods of the current averaging period $T_{AVG}$ (e.g., according to equation 6). RFE averaging circuitry 60 may provide consumed SAR value $SAR_{CONSUMED}$ and/or consumed MPE value $MPE_{CONSUMED}$ to remaining RFE budget calculation circuitry 66.

At operation 92, remaining RFE budget calculation circuitry 66 may generate remaining SAR budget $SAR_{REM}$ based on SAR budget $BGT_{SAR}$, consumed SAR value $SAR_{CONSUMED}$, the duration of averaging period $T_{AVG}$, the elapsed portion $T_{ELAPSED}$ of the averaging period, and the remaining portion $T_{REM}$ of the averaging period (e.g., according to equation 7). Additionally or alternatively, remaining RFE budget calculation circuitry 66 may generate remaining MPE budget $MPE_{REM}$ based on MPE budget $BGT_{MPE}$, consumed MPE value $MPE_{CONSUMED}$, the duration of averaging period $T_{AVG}$, the elapsed portion $T_{ELAPSED}$ of the averaging period, and the remaining portion $T_{REM}$ of the averaging period (e.g., according to equation 8). Remaining RFE budget calculation circuitry 66 may provide remaining SAR budget $SAR_{REM}$ and/or remaining MPE budget $MPE_{REM}$ to RFE budget conversion circuitry 36.

At operation 94, RFE budget conversion circuitry 36 may generate maximum power limit $PLIMIT_{SAR}$ for the next instantaneous period of the current averaging period $T_{AVG}$ based on remaining SAR budget $SAR_{REM}$ and antenna coefficient C1 (e.g., by replacing SAR budget $BGT_{SAR}$ in equation 1 with remaining SAR budget $SAR_{REM}$). Additionally or alternatively, RFE budget conversion circuitry 36 may generate maximum power limit $PLIMIT_{MPE}$ for the next instantaneous period of the current averaging period $T_{AVG}$ based on remaining MPE budget $MPE_{REM}$ and antenna coefficient C2 (e.g., by replacing MPE budget $BGT_{MPE}$ in equation 2 with remaining MPE budget $MPE_{REM}$).

If instantaneous periods remain in the current averaging period $T_{AVG}$ (e.g., if $T_{REM}$ is greater than the duration of one instantaneous period), processing may proceed to operation 98 via path 96 to increment the current instantaneous period of the current averaging period $T_{AVG}$. Processing may then proceed to operation 100. At operation 100, transmitter 40 may transmit radio-frequency signals during the current (e.g., incremented) instantaneous period subject to maximum transmit power levels $PLIMIT_{SAR}$ and/or $PLIMIT_{MPE}$. Processing may then loop back to operation 86 via path 102 to allow radio 28 to continue to perform time-domain averaging of SAR and/or MPE for updating the maximum transmit power levels $PLIMIT_{SAR}$ and/or $PLIMIT_{MPE}$ used for transmission during the remainder of the current averaging period $T_{AVG}$. Once no instantaneous periods remain in the current averaging period (e.g., when $T_{REM}$ is less than the duration of an instantaneous period), processing may proceed from operation 94 to operation 106 via path 104 to increment the current averaging period $T_{AVG}$. Processing may then loop back to operation 82 via path 108 to perform time-domain averaging of SAR/MPE for ensuring RFE compliance over the current (incremented) averaging period $T_{AVG}$.

The example of FIG. 5 is merely illustrative. Two or more of the operations of FIG. 5 may be performed concurrently or in other orders. If desired, RFE budget conversion circuitry 36 may omit generation of maximum transmit power levels $PLIMIT_{SAR}$ and $PLIMIT_{MPE}$ when there are no instantaneous periods remaining in the current averaging period. Radio 28 may change the duty cycle DC, frequency band BND, and/or the active antenna 34 during or between iterations of the operations of FIG. 5. Antenna coefficient database 55 may update the antenna coefficients C1/C2 used during one or more of these operations as necessary to account for changes in duty cycle DC, frequency band BND, and/or active antenna 34. Device 10 may also change positions or orientations during or between iterations of the operations of FIG. 5 (e.g., in a manner that affects SAR/MPE produced by radio 28). Antenna coefficient database 55 may update the antenna coefficients C1/C2 used during one or more of these operations as necessary to account for changes in device position or orientation. RF exposure metric manager 26 may also change the SAR budget $BGT_{SAR}$ and/or the MPE budget $BGT_{MPE}$ for radio 28 during or between iterations of the operations of FIG. 5. This may ensure that radio 28 maintains RFE compliance even when duty cycle DC, frequency band BND, the active antenna 34, or the device position changes over time.

To further illustrate some of the advantages of maintaining RFE compliance via time-averaging SAR/MPE rather than conducted TX power, consider an example in which device 10 transitions from a first position adjacent to a user's head to a second position on the user's body but away from the user's head. In this example, device 10 may be subject to an averaging period $T_{AVG}$ of 60 seconds, may spend the first thirty seconds of the averaging period in the first position, and may spend the last thirty seconds of the averaging period in the second position. For the sake of illustration, radio 28 may receive a SAR budget $BGT_{SAR}$ of 2 W/kg for the averaging period (e.g., at operation 80 of FIG. 5).

Figure 6:
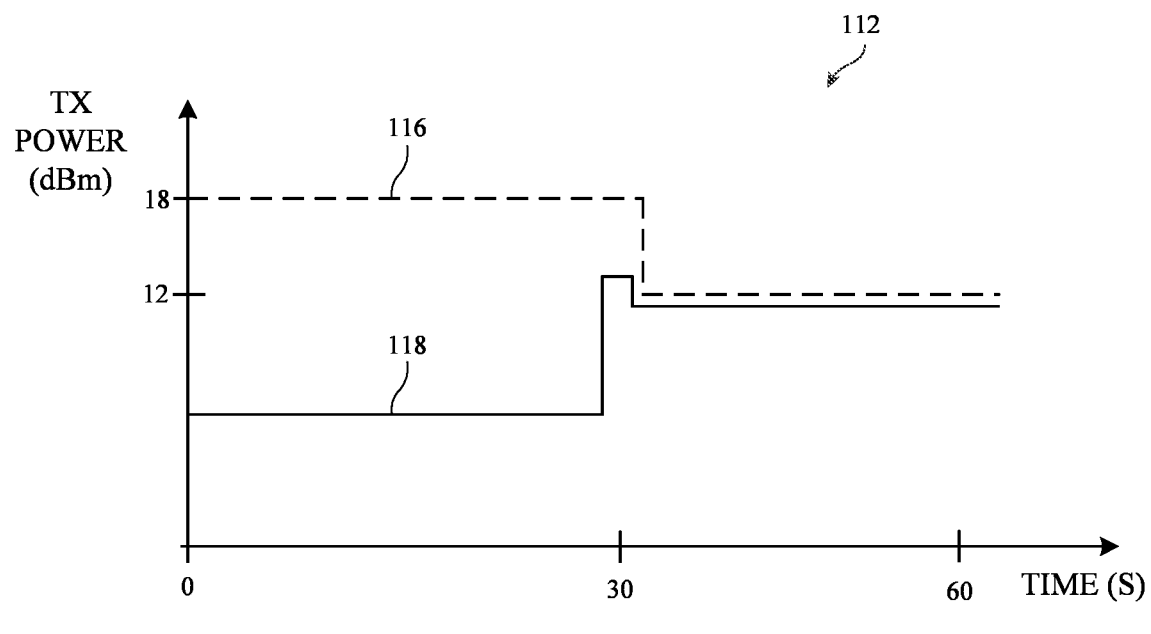
FIGS. 6 and 7 are plots of power over time showing how time-averaging RFE metrics may optimize radio-frequency performance for a radio in accordance with some embodiments.
Figure 6:
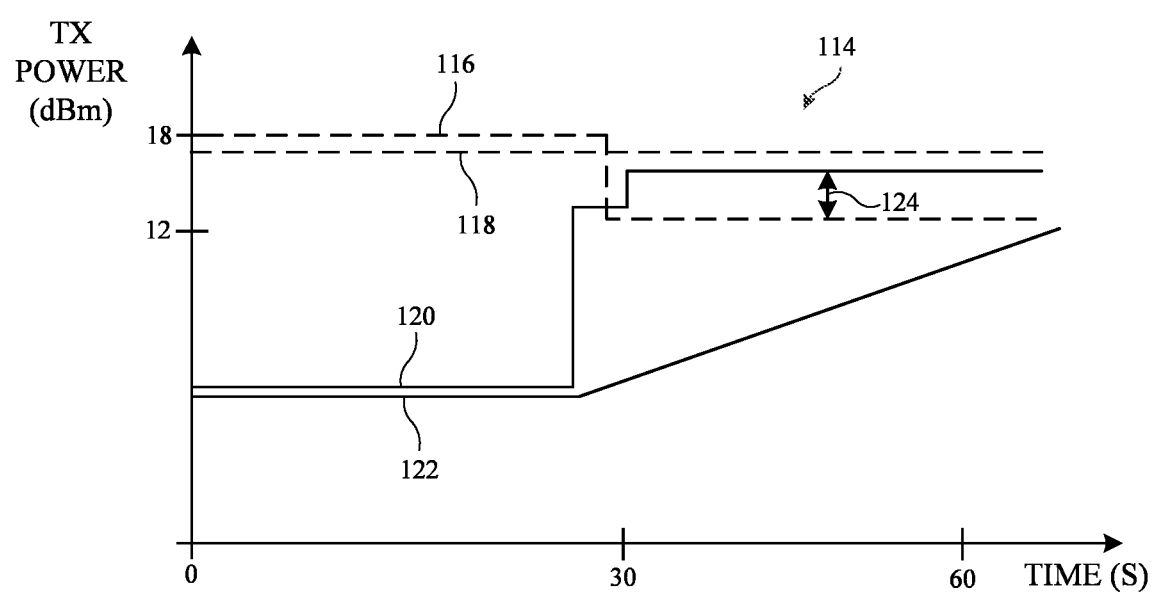

Plot 112 of FIG. 6 illustrates this example when device 10 performs time-averaging of conducted TX power rather than time-averaging SAR for RFE compliance. Curve 116 of plot 112 illustrates the maximum transmit power level that would be imposed in this scenario. At 30 seconds, the maximum transmit power level reduces from 18 dBm (63 mW) to 12 dBm (15.8 mW) due to the change in device position. Curve 118 of plot 112 illustrates the instantaneous transmit power level of transmitter 40. As shown by curve 118, the instantaneous transmit power of transmitter 40 is forced to remain below the maximum transmit power level associated with curve 116 (e.g., 12 dBm) for the entire remainder of the averaging period (e.g., from 30 to 60 seconds) to maintain SAR compliance. This may limit the radio-frequency performance (e.g., efficiency and throughput) of transmitter 40 in communicating with external communications equipment.

Plot 114 of FIG. 6 illustrates the same example but where device 10 performs time-averaging of SAR rather than time-averaging of conducted TX power. Curve 118 plots the applicable SAR limit. Curve 120 plots instantaneous transmit power level of transmitter 40. Curve 122 plots the time-averaged total SAR (e.g., consumed SAR value $SAR_{CONSUMED}$) over the current averaging period. During the first thirty seconds of the averaging period, one or more sensors on device 10 may identify that device 10 is in the first position (e.g., adjacent to a user's head). Antenna coefficient database 55 may, for example, identify an antenna coefficient C1 that is equal to 1/63 when device 10 is in the first position (e.g., for the corresponding active antenna, frequency band BND, and duty cycle DC). Radio 28 may, for example, transmit with a constant 15 dBm during the first thirty seconds of the averaging period. In this example, the average SAR consumed is equal to 0.5 W/kg (e.g., where 15 dBm=31.62 mW and 31.62 mW*(1/63)=0.5 W/kg).

After 30 seconds of the averaging period have elapsed, the sensors on device 10 may identify that device 10 is in the second position (e.g., on the user's body but away from the user's head). Antenna coefficient database 55 may, for example, identify an antenna coefficient C1 that is equal to 1/15.8 when device 10 is in the second position (e.g., for the corresponding active antenna, frequency band BND, and duty cycle DC). The available SAR budget remaining for seconds 30-60 is equal to 1.5 W/kg (e.g., since 0.5 W/kg of the 2 W/kg SAR budget $BGT_{SAR}$ were consumed during seconds 0-30). This is equivalent to a transmit power limit of 13.7 dBm (e.g., where 1.5 W/kg/(1/15.8)=23.7 mW or 13.7 dBm). As such, radio 28 may transmit with a maximum transmit power level of 13.7 dBm during seconds 30-60 instead of transmitting at only 12 dBm (e.g., as shown in plot 112). This allows the transmit power level to exceed the limit associated with curve 116 by margin 124, thereby maximizing the radio-frequency performance (e.g., throughput and efficiency) of radio 28 relative to scenarios where a strict TX power limit is applied or where time-domain averaging of conducted TX power is performed instead of time-domain averaging of SAR. At the same time, the time-averaged total SAR associated with curve 122 remains below SAR limit 118, thereby ensuring that radio 28 satisfies regulatory limits on SAR. Time-domain averaging of MPE may be performed similarly when the transmitted radio-frequency signals are greater than 6 GHz.

Consider another example in which radio 28 is a cellular radio and in which device 10 transitions from performing only cellular transmissions with radio 28 from seconds 0-30 of the averaging period to performing both cellular transmissions with radio 28 and Wi-Fi transmissions (e.g., using an additional radio) during seconds 30-60 of the averaging period. In this example, radio 28 may receive a SAR budget $BGT_{SAR}$ of 1 W/kg for seconds 0-30 of the averaging period and may receive a SAR budget $BGT_{SAR}$ of 0.5 W/kg for seconds 30-60 of the averaging period (e.g., because RF exposure metric manager 26 of FIG. 1 allocates some of the overall SAR budget for device 10 to the Wi-Fi radio).

Figure 7:
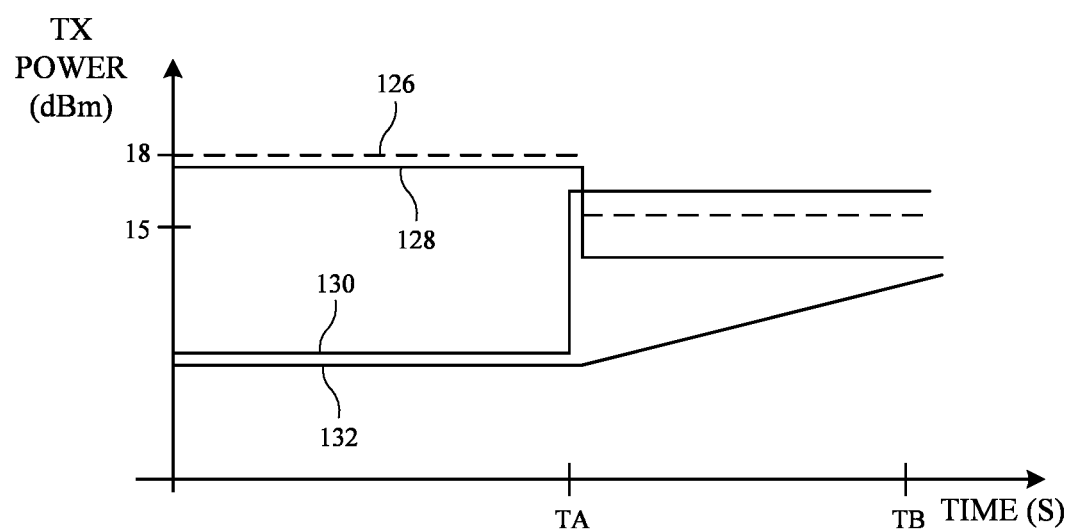

FIG. 7 illustrates this example when device 10 performs time-averaging of SAR rather than time-averaging of conducted TX power. Curve 126 plots the applicable transmit power limit, which reduces from 18 dBm to 15 dBm in response to the activation of the Wi-Fi radio. Curve 128 plots the applicable SAR limit. Curve 130 plots instantaneous transmit power level of transmitter 40. Curve 132 plots time-averaged total SAR. Radio 28 may have the same antenna coefficient C1 during both seconds 0-30 and seconds 30-60 (e.g., because activation of the Wi-Fi radio does not affect the conducted power of the antenna 34 used for cellular communications). Radio 28 may, for example, transmit with a constant 15 dBm during the first thirty seconds of the averaging period. In this example, the average SAR consumed is equal to 0.5 W/kg (e.g., where 15 dBm=31.62 mW and 31.62 mW*(1/63)=0.5 W/kg). Since the SAR budget for the first 30 seconds is 1 W/kg in this example, there is 0.5 W/kg of SAR budget that goes unused from seconds 0-30. Radio 28 therefore has an expanded SAR budget of 1.0 W/kg for seconds 30-60 (e.g., the 0.5 W/kg assigned in the SAR budget $SAR_{BGT}$ plus the unused 0.5 W/kg from the first 30 seconds). This is equivalent to a transmit power limit of 18 dBm (e.g., where 1 W/kg/(1/63)= 63 mW or 18 dBm). As such, radio 28 may transmit with a maximum transmit power level of 18 dBm during seconds 30-60 instead of transmitting at only 15 dBm or lower, as would be the case if time-domain averaging of conducted power were used. This thereby serves to maximize the radio-frequency performance (e.g., throughput and efficiency) of radio 28 relative to scenarios where time-domain averaging of conducted TX power is performed instead of time-domain averaging of SAR. At the same time, the time-averaged total SAR associated with curve 132 remains below SAR limit 128, thereby ensuring that radio 28 satisfies regulatory limits on SAR. Time-domain averaging of MPE may be performed similarly when the transmitted radio-frequency signals are greater than 6 GHz. The examples of FIGS. 6 and 7 are merely illustrative.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-7 (e.g., the operations of FIG. 5) may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry. The components of FIGS. 1-4 may be implemented using hardware (e.g., circuit components, digital logic gates, one or more processors, etc.) and/or using software where applicable. While databases are sometimes described herein as providing data to other components (see, e.g., antenna coefficient database 55 of FIG. 2), one or more processors, memory controllers, or other components may actively access the databases, may retrieve the stored data from the database, and may pass the retrieved data to the other components for corresponding processing. The regulatory SAR limit, MPE limit, and averaging times described herein need not be imposed by a government or regulatory body and may additionally or alternatively be imposed by a network operator, base station, or access point of a wireless network in which device 10 operates, by device 10 itself, by the manufacturer or designer of some or all of device 10, by wireless industry standards, protocols, or practices, by software running on device 10, etc.

The foregoing is merely illustrative and various modifications can be made to the described embodiments. The foregoing embodiments may be implemented individually or in any combination.

What is claimed is:

1. A method of operating an electronic device subject to a regulatory limit on transmitted power over an averaging period, the regulatory limit having a first level when an external object is located at a first position relative to the electronic device and a second level that is lower than the first level when the external object is located at a second position relative to the electronic device, the method comprising:
with one or more antennas, transmitting radio-frequency signals at a first transmit power level that is less than the first level during a first portion of the averaging period when the external object is at the first position relative to the electronic device; and
with the one or more antennas, transmitting radio-frequency signals at a second transmit power level that exceeds the second level during a second portion of the averaging period when the external object is at the second position relative to the electronic device.

2. The method of claim 1, wherein the second position is closer to the electronic device than the first position.

3. The method of claim 1, wherein the radio-frequency signals are at a frequency greater than 6 GHz.

4. The method of claim 1, wherein the radio-frequency signals are at a frequency less than 6 GHz.

5. The method of claim 1, wherein the second portion of the averaging period is after the first portion of the averaging period.

6. The method of claim 1, wherein the first transmit power level is at or below a first maximum transmit power level that is based on an antenna coefficient of the one or more antennas.

7. The method of claim 6, wherein the first maximum transmit power level is based on a radio-frequency exposure (RFE) budget.

8. The method of claim 7, wherein the second transmit power level is at or below a second maximum transmit power level that is based on an instantaneous RFE metric value associated with the one or more antennas during the first portion of the averaging period and a consumed RFE metric value associated with the one or more antennas.

9. An electronic device subject to a regulatory limit on transmitted power over an averaging period, the regulatory limit having a first level when an external object is located at a first position relative to the electronic device and a second level that is lower than the first level when the external object is located at a second position relative to the electronic device, the electronic device comprising:
a radio; and
one or more antennas coupled to the radio, wherein the radio is configured to use the one or more antennas to
transmit radio-frequency signals at a first transmit power level that is less than the first level during a first portion of the averaging period when the external object is at the first position relative to the electronic device; and
transmit radio-frequency signals at a second transmit power level that exceeds the second level during a second portion of the averaging period when the external object is at the second position relative to the electronic device.

10. The electronic device of claim 9, further comprising:
a sensor configured to measure whether the external object is at the first position or the second position relative to the electronic device.

11. The electronic device of claim 10, wherein the sensor comprises a radio-frequency sensor coupled to the one or more antennas.

12. The electronic device of claim 9, wherein the radio-frequency signals are at a frequency greater than 6 GHz.

13. The electronic device of claim 9, wherein the radio-frequency signals are at a frequency less than 6 GHz.

14. The electronic device of claim 9, wherein the second portion of the averaging period is after the first portion of the averaging period.

15. The electronic device of claim 9, wherein the first transmit power level is at or below a first maximum transmit power level that is based on an antenna coefficient of the one or more antennas.

16. The electronic device of claim 15, wherein the first maximum transmit power level is based on a radio-frequency exposure (RFE) budget.

17. The electronic device of claim 16, wherein the second transmit power level is at or below a second maximum transmit power level that is based on an instantaneous RFE metric value associated with the one or more antennas during the first portion of the averaging period and a consumed RFE metric value associated with the one or more antennas.

18. An electronic device comprising:
one or more antennas; and
a radio communicably coupled to the one or more antennas, the radio being configured to
transmit first radio-frequency signals using the one or more antennas during a first subperiod of an averaging period while subject to a first maximum transmit power level that is based on a radio-frequency exposure (RFE) budget assigned to the radio and an antenna coefficient associated with the one or more antennas antenna, and
transmit second radio-frequency signals using the one or more antennas during a second subperiod of the averaging period subsequent to the first subperiod while subject to a second maximum transmit power level that is based on a remaining RFE budget and the antenna coefficient.

19. The electronic device of claim 18, wherein the remaining RFE budget comprises a remaining RFE budget for the averaging period that is based on a consumed RFE metric value and the RFE budget.

20. The electronic device of claim 19, wherein the consumed RFE metric value is based on an instantaneous RFE metric value that is based on a conducted transmit power of the one or more antennas during the first subperiod.

* * * * *